United States Patent [19]

Ishida

[11] 3,953,660

[45] Apr. 27, 1976

[54] SURFACE PROTECTIVE FILM FOR PLASTICIZED POLYVINYL CHLORIDE SUBSTRATES

[75] Inventor: Tadashige Ishida, Tokyo, Japan

[73] Assignee: Tamapoly Co., Ltd., Tokyo, Japan

[22] Filed: Mar. 29, 1974

[21] Appl. No.: 456,184

[52] U.S. Cl. .............................. 428/518; 428/520; 428/522
[51] Int. Cl.² ............... B32B 27/08; B32B 27/30
[58] Field of Search ............. 117/6, 76 B, 138.8 A, 117/138.8 F, 138.8 N, 138.8 UA, 138.8 E, 161 UC; 260/29.6 WB, 29.6 RB, 879, 884, 885; 428/518, 520, 522

[56] References Cited

UNITED STATES PATENTS

| | | | |
|---|---|---|---|
| 2,569,954 | 10/1951 | Ruebensaal | 161/256 |
| 3,347,811 | 10/1967 | Bissot | 260/29.6 |
| 3,358,054 | 12/1967 | Hardt et al. | 260/878 |
| 3,442,687 | 5/1969 | Hagan | 117/72 |
| 3,445,263 | 5/1969 | Alexander | 117/47 |
| 3,533,878 | 10/1970 | Aulik et al. | 156/320 |
| 3,558,542 | 1/1971 | McDonald | 260/27 |
| 3,567,487 | 3/1971 | Poppe et al. | 117/47 |
| 3,577,365 | 5/1971 | Folzenlogen et al. | 260/4 |
| 3,637,428 | 1/1972 | Aleckner | 117/138.8 E |
| 3,662,053 | 5/1972 | Yoshikawa et al. | 264/129 |
| 3,725,124 | 4/1973 | Gorton | 117/138.8 |
| 3,801,531 | 4/1974 | Berejka et al. | 260/33.4 |
| 3,804,705 | 4/1974 | Kishikawa et al. | 161/253 |

OTHER PUBLICATIONS

Poller, Def. Pub. Search Copy of Ser. No. 555,667, filed June 7, 1966, Published in 861 O.G. 367, Def. Pub. No. T861-016.

*Primary Examiner*—P. E. Willis, Jr.
*Attorney, Agent, or Firm*—Oldham & Oldham Co.

[57] ABSTRACT

This invention relates to a surface protective film for a plastic article containing a plasticizer use comprising an adhesive layer of 10–100 $\mu$ in thickness consisting of 100 parts by weight of a polymer or copolymer having ethylenic linkage and 1–100 parts by weight of an olefin homopolymer or copolymer or a mixture thereof containing chlorine atoms and having a means solubility parameter between 8.0–11.0 coated on a surface of a basic plastic film of 10–100 $\mu$ in thickness.

The said film possesses a suitable strength for peeling off the said surface protective film from the said article to be covered in a hot temperature of more than 40°C as well as in a low temperature of less than 0°C.

10 Claims, No Drawings

SURFACE PROTECTIVE FILM FOR PLASTICIZED POLYVINYL CHLORIDE SUBSTRATES

BACKGROUND OF THE INVENTION

1. Field of the Invention

This invention relates to the surface protective film suitable for adhesively protecting the surface of the plastic article containing the plasticizer, namely the surface of the polyvinyl chloride film or sheet containing the plasticizer coated on one side or the both sides of the metal plate or the ornamental veneer board until the secondary processing or the final finishing after manufacturing thereof.

2. Description of Prior Art

Heretobefore, a pressure sensitive adhesive film coated with an adhesive agent on a paper or the basic plastic film has been used as the surface protective film. The said pressure sensitive adhesive film possesses the usual adhesive strength of the peeling velocity of 200 mm/min. under the condition of the loads of 20–200 grs., 180°angle and 20mm width.

However, the said pressure sensitive adhesive film increases the strength of the adhesive layer and makes it difficult to peel off said film from the surface of the article namely the surface of the plastic sheet containing the plasticizer precoated on the metal plate or the ornamental veneer board and remains the adhesive layer (or agent) on the surface of the said article in a low temperature of less than 0°C. While, the said film often lost the faculty of the protective film depressing the adhesive force to null value in a high temperature of more than 40°C.

The said phenomenon is based on increasing the adhesive strength of the adhesive agent and on decreasing the fluidity of the plasticizer contained in the polyvinyl chloride film or sheet precoated on the metal plate or the ornamental veneer board in the low temperature, while the said phenomenon is based on increasing the fluidity of the plasticizer and oozing out the plasticizer at a boundary surface between the protective film or sheet and the surface of the article in the form of a film thereby depressing the adhesive force of the protective film.

In order to overcome the said disadvantages, it has been studied chemico-physical properties of the adhesive layer and found the adhesive composition having good quality.

SUMMARY OF THE INVENTION

The present invention relates to the surface protective film comprising the basic plastic film coated with the adhesive layer thereon and the said adhesive layer of 10–100 $\mu$ in thickness consists of 100 parts by weight of the polymer or copolymer having ethylenic linkage (the vinyl polymer or copolymer) and 1–100 parts by weight of the olefin polymer or copolymer containing chlorine atoms and having the mean solubility parameter of 8.0–11.0.

The said surface protective film possesses the characteristic feature of peeling off the adhesive layer from the basic plastic film which supports the said adhesive layer and an antiblocking property.

DESCRIPTION OF THE PREFERRED EMBODIMENT

The basic plastic film precoated with the adhesive layer thereon is the polymer or the copolymer capable of supporting the adhesive layer and of the antiblocking property. The basic plastic film comprises polyethylene, polypropylene, polyamide, polyester, ethylene-vinyl acetate copolymer, polyvinylchloride and another polymer or copolymer. It has been required that the said basic plastic film has the property of not breaking the surface protective film in bending and pressing out when the article has the secondary processing together with the surface protective film covering the article, and the property of having a relatively good transparency when observing the surface state of the article through the surface protective film and the property capable of molding together with the adhesive layer which is a sort of the plastic material. On considering the said properties required, the basic plastic film is profitable than the paper which has been used in the prior art. The thickness of the said basic plastic film is suitable to be of 10–100 $\mu$, from the economical and practical points of view.

The thickness of the said basic plastic film may be freely selected according to the use object.

Although the method for coating the adhesive layer on the basic plastic film is not limited, the corona discharging means and the anchor coating means may be used.

The vinylpolymer or copolymer, one of the components of the adhesive layer comprises ethylene-vinylacetate copolymer, ethylene-ethylacrylate copolymer, ethylene-propylene copolymer, ethylene-vinylalcohol copolymer, ethylene-propylene copolymer, ethylene-vinylalcohol copoymer, vinylalcohol homopolymer, partial formalated polyvinyl alcohol, polyvinylbutyral and the vinylpolymer or copolymer having properties adhesive to the article to be coated.

The sort of the vinylpolymer or copolymer and the combination thereof may be selected according to the object of the application and easiness of peeling off the surface protective film from the article after the use.

Further, a tackifier may be used to supplement or regulate the adhesive property of the vinylpolymer or copolymer. The said tackifier is effective to improve the adhesive strength at a low temperature. The tackifier comprises rosin, modified rosin, polyterpene, styrene-butadiene rubber, acrylonitrile-butadiene rubber, cyclicrubber, cumarone resin, indene resin, and a common adhesive agent which possesses the compatibility to the vinylpolymer or copolymer. The use of the said tackifier is not an essential matter but is profitable when the surface protective film is properly used according to the object.

The amount used is in a range of 3–30 wt%, preferably 5–20 wt% on the basis of the amount of the polymer or copolymer.

The olefin homopolymer or copolymer, the another component of the adhesive layer, means that containing chlorine atoms and having the mean solubility parameter between 8.0–11.0.

The said olefin homopolymer or copolymer comprises chloroprene, polyvinyl-chloride, polyepichlorohydrin, vinylchloride-vinylacetate copolymer, vinylchloride-vinylether copolymer, vinylchloride-vinylidene chloride copolymer, the graft polymer of vinylchloride and ethylene-vinylacetate copolymer and a mixture thereof. The said olefin homopolymer or copolymer may be chlorinated polyethylene, chlorinated polypropylene, chlorinated polyvinylchloride. Solubility parameter is the important index of estimating the compatibility of organic compounds and that of the polymer and the organic solvent.

It is described in the book "Vinylchloride resin" of the plastic material course Bd. 18 page 105 that the more the approximation of solubility parameter between polyvinyl chloride and its plasticizer becomes large, the more the compatibility thereof becomes large. Solubility parameter of the polymer does not show a constant value in the relatively low molecular weight polymer but show within the certain limit according to the calculation method, for example, 9.5–9.7 for polyvinyl-chloride, 8.2–9.4 for polychloroprene (High molecular society edition; High molecular engineering course Fourth Bd. P. 444).

As mentioned above, the adhesive force of the prior surface protective film remarkably depress owing to oozing out the plasticizer from the polyvinyl chloride film or sheet containing the plasticizer therein and the said plasticizer spreads in the form of a film at the boundary surface between the surface adhesive film and the surface of the article covered with the said film.

It has been found by the inventor of this application that the said plasticizer film deposited is absorbed into the adhesive layer by means of the olefin homopolymer or copolymer containing chlorine atoms and having the mean solubility parameter between 8.0–11.0 contained in the adhesive layer thereby preventing the formation of the said plasticizer film and obtaining the surface protective film which possesses the stable adhesive force for the long period.

On considering the affinities of the plasticizer and the olefin polymer or copolymer and of the vinylpolymer or copolymer and the olefin polymer or copolymer, the sort of the chlorine-containing polymer or copolymer and the compounding ratio thereof may be selected so as to be the mean solubility parameter of 8.0–11.0.

The compounding ratio of the olefin homopolymer or copolymer to the vinylpolymer or copolymer is within 1–100 parts by weight on the weight basis of 100 parts of the vinylpolymer or copolymer and is preferable to be 10–60 parts by weight.

The stablilizer, commonly used in the processing of polyvinyl chloride, for example organic stannous or lead compounds, may be used to improve the thermal stability.

The compounding ratio, the order of compounding and the compounding procedure thereof and the apparatus to be used in the compounding processing are similar to those in polyvinyl chloride.

The thickness of the adhesive layer is selected in a range of 10–100μ, preferably 20–80μ. When the thickness of the adhesive layer is less than 10μ, the sufficient adhesive force is not obtained, while, when the thickness of the adhesive layer is more than 100μ, the possibility of the secondary processing of the article covered with the surface protective film will depress thereby becoming disadvantageous in the economical point of view.

The surface protective film of this invention may be manufactured by the coextruding method, the co-inflation method, the coating method of the adhesive agent on the basic plastic film by means of the extruder, the coating method of the premelted adhesive agent on the basic plastic film by means of the blade coating or the roller coating, the thermally adhering method of the basic plastic film and the adhesive film which have been individually manufactured and the method of putting together the basic plastic film and the adhesive layer film by means of the adhesive agent or the thermal-melting process.

The co-extruding method is considered to be a cheap and advantage method since the basic plastic film for supporting the adhesive layer as well as protecting the blocking phenomenon and the adhesive layer are simultaneously manufactured. The application of the surface protective film of this invention may be effected not only by the heat sensitive adhesive force but also by the joint use of the heat sensitive adhesive force and the pressure sensitive adhesive force.

The adhesive may be effected in a temperature of 40–150°C, preferably 60–100°C by heating either the surface protective adhesive film or the article to be covered or both of them.

The adhesive may be effected under a slightly elevated atmosphere when both the surface protective film and the said article are sufficiently heated to prevent the penetration of air therebetween, while the said adhesive may be effected under a higher pressure than that in the case of the said temperature.

The necessary time for adhering the surface protective film and the article is sufficient within few seconds depending to the demand of the adhesive force of the surface protective film.

The present invention will be fully explained by means of the following examples. The part and the weight are shown in the weight basis.

EXAMPLE 1

1. The basic plastic film
Low density polyethylene film of s.g. 0.923, M.I. (melt index) 3.5, thickness 20μ.
2. The adhesive layer
The composition

| (A) | Ethylene-vinylacetate copolymer | 100 parts |
|---|---|---|
|  | Vinylacetate content | 17 wt% |
| (B) | Vinylchloride-vinylacetate copolymer | 20 parts |
|  | Vinylacetate content | 18 wt% |
|  | S.P. | 9.7 – 9.8 |
|  | Thickness | 40 μ |

EXAMPLE 2

1. The basic plastic film
Low density polyethylene film, s.g. 0.923, M.I. 3.5, thickness 25μ.
2. The adhesive layer
The composition

| (A) | Ethylene-vinylacetate copolymer | 100 parts |
|---|---|---|
|  | Vinylacetate content | 17 wt% |
| (B) | Graft polymer of Vinylchloride and ethylene-vinylacetate copolymer | 20 parts |
|  | Vinylacetate content | 12 wt% |
|  | S.P. | 9.5 – 9.6 |
|  | Thickness | 25 μ |

EXAMPLE 3

1. The basic plastic film
Low density polyethylene film, s.g. 0.923, M.I. 3.5, thickness 20μ.
2. The adhesive layer
The composition

| (A) | Ethylene-ethylacrylate copolymer | 100 parts |
|---|---|---|
|  | Ethylacrylate content | 8 wt% |
| (B) | Vinylchloride-vinylacetate copolymer | 20 parts |
|  | Vinylacetate content | 18 wt% |

EXAMPLE 4

1. The basic plastic film
Low density polyethylene film, s.g. 0.923, M.I. 3.5, thickness 40μ.
2. The adhesive layer
The composition

| | | |
|---|---|---|
| (A) | Ethylene-vinylacetate copolymer | 100 parts |
| | Vinylacetate content | 19 wt% |
| (B) | Vinylchloride-vinylacetate copolymer | 5 parts |
| | S.P. | 9.7 – 9.8 |
| (C) | Styrene-butadiene rubber | 10 parts |
| | Thickness | 30 μ |

EXAMPLE 5

1. The basic plastic film
Low density polyethylene film s.g. 0.923, M.I. 3.5, thickness 40μ.
2. The adhesive layer
The composition

| | | |
|---|---|---|
| (A) | Ethylene-vinylacetate copolymer | 100 parts |
| | Vinylacetate content | 19 wt% |
| (B) | Vinylchloride-vinylacetate copolymer | 28 parts |
| | Vinylacetate content | 18 wt% |
| | S.P. | 9.7 – 9.8 |
| (C) | Graft polymer of Vinyl chloride and ethylene-vinylacetate copolymer | 12 parts |
| | Vinylacetate content | 12 wt% |
| | S.P. | 9.8 – 9.9 |
| | Thickness | 60 μ |

EXAMPLE 6

1. The basic plastic film

| | |
|---|---|
| Polypropylene film | 20 μ in thickness |
| Polyethylene film | 35 μ in thickness |

The films are coated with each other by means of the laminate molding.
2. The adhesive layer
The composition

| | | |
|---|---|---|
| (A) | Ethylene-vinylacetate copolymer | 100 parts |
| | Vinylacetate content | 19 wt% |
| (B) | Vinylchloride-vinylacetate copolymer | 10 parts |
| | Vinylacetate content | 18 wt% |
| | S.P. | 9.7 – 9.8 |
| (C) | Chlorinated polyethylene | 5 parts |
| | S.P. | 9.6 – 9.8 |
| | Thickness | 50 μ |

(Note)
The surface protective film was manufactured from the polyethylene film of 20μ in thickness and the adhesive layer of 50μ in thickness by means of the co-inflation method.

The polyethylene film obtained of 15μ in thickness was laminated with the polypropylene film by means of the laminate method.

EXAMPLE 7

1. The basic plastic film
Low density polyethylene film s.g. 0.923, M.I. 3.5, thickness 40μ.

2. The adhesive layer
The composition

| | | |
|---|---|---|
| (A) | Ethylene-vinylacetate copolymer | 100 parts |
| | Vinylacetate content | 18 wt% |
| (B) | Vinylchloride-vinylacetate copolymer | 20 parts |
| | Vinylacetate content | 18 wt% |
| | S.P. | 9.7 – 9.8 |
| (C) | Polyvinylbutyral copolymer | 10 parts |
| | Polyvinyl butyral content more than 75 wt% | |
| | Polyvinyl alcohol content about 20 wt% | |
| | Average polymerization degree | 1000 |
| | Thickness | 50 μ |

EXAMPLE 8

1. The basic plastic film
Low density polyethylene s.g. 0.925, M.I. 2.0, thickness 40μ.
2. The adhesive layer
The composition

| | | |
|---|---|---|
| (A) | Ethylene-vinylacetate copolymer | 100 parts |
| | Vinylacetate content | 12 wt% |
| (B) | Polychloroprene | 20 parts |
| | S.P. | 9.1 |
| | Thickness | 30 μ |

EXAMPLE 9

1. The basic plastic film
Low density polyethylene s.g. 0.923 M.I. 3.5, thickness 40μ.
2. The adhesive layer
The composition

| | | |
|---|---|---|
| (A) | Ethylene-vinylacetate copolymer | 100 parts |
| | Vinylacetate content | 19 wt% |
| (B) | Vinylchloride-vinylacetate copolymer | 15 parts |
| | Vinylacetate content | 18 wt% |
| | S.P. | 9.7 – 9.8 |
| (C) | Vinylchloride-vinylidene chloride copolymer | 5 parts |
| | Vinylidene chloride content | 20 wt% |
| | S.P. | 9.9 – 10.1 |
| | Thickness | 25 μ |

COMPARATIVE EXAMPLE 1

The commercial pressure sensitive protective film

| | |
|---|---|
| Thickness | 20 μ |
| The composition | unknown |
| Thickness | 100 μ (total) |

COMPARATIVE EXAMPLE 2

1. The basic plastic film
Low density polyethylene s.g. 0.923, M.I. 3.5, thickness 20μ.
2. The adhesive layer
The composition

| | |
|---|---|
| Ethylene-vinylacetate copolymer | |
| Vinylacetate content | 28 wt% |
| Thickness | 40 μ |

COMPARATIVE EXAMPLE 3

1. The basic plastic film
Low density polyethylene s.g. 0.923, M.I. 3.5, thickness 25μ.
2. The adhesive layer The composition

| (A) | Ethylene-vinylacetate copolymer | 100 parts |
| | Vinylacetate content | 17 wt% |
| (B) | Rosin | 20 parts |
| | Thickness | 25 μ |

The text method i. The adhering method

The surface protective film was adhered on the surface of the article to be coated at the speed of 5 m/min. under the pressure of 1 kg/cm² by means of gumroller after coating at the temperature as indicated above or adhered under the finger pressure at the ordinary or the room temperature.

ii. The measurement of the adhesive strength.

The surface protective film was cutted in 20 mm width and then measured by stripping at 180° angle by means of the shopper testing machine.

iii. The heating method

The test piece was allowed to settle at the temperature of 50°C in the geared oven.

The above mentioned condition correspond to the lapse of few months under the conventional storage conditions.

iv. The cooling method.

The test piece was cooled to −10°C by means of a refrigeration.

polymer, ethylene-vinylalcohol copolymer, vinylalcohol homopolymer and polyvinylbutyral; and from 1 to 100 parts by weight of chlorine containing olefin polymer selected from the group consisting of chloroprene, polyvinyl-chloride, polyepichlorohydrin, vinylchloride-vinylacetate copolymer, vinylchloride-vinylether copolymer, vinylchloride-vinylidene chloride copolymer, the graft polymer of vinylchloride and ethylene-vinylacetate copolymer and a mixture thereof, chlorinated polyethylene, chlorinated polypropylene, and chlorinated polyvinylchloride, said olefin polymer having a solubility parameter of between 0.8 and 11.0, and said adhesive layer is applied to a substrate of polyvinyl-chloride of 10 to 100μ in thickness.

2. A film according to claim 1, wherein said adhesive protective film is applied to said substrate at a temperature of from 40° to 150°C.

3. A surface protective film according to claim 2, wherein said olefin polymer is a graft polymer of vinylchloride and ethylene-vinylacetate copolymer or vinylchloride-vinylidene chloride copolymer.

4. A surface protective film according to claim 2, including a tackifier, said tackifier ranging from 3 to 30 percent by weight based on the amount of polymer or copolymer.

5. A surface protective film according to claim 4,

Table

| Protective film | Article to be coated | Adhesive temp. °C | Early adhesive force g/20 mm width | Adhesive force after heating 100 hrs at 50°C g/20 mm width | Adhesive force after cooling for a week at −10°C |
| --- | --- | --- | --- | --- | --- |
| Ex. 1 | Steel plate precoated with vinyl chloride containing 30% plasticizer | 80 | 180 | 40 | — |
| " | " | 60 | 70 | — | 60 |
| " | Steel plate precoated with vinyl chloride containing 50% plasticizer | 80 | 160 | 30 | — |
| Ex. 2 | Steel plate precoated with vinylchloride containing 30% plasticizer | 80 | 160 | 40 | 40* |
| " | Ornamental plate precoated with vinylchloride containing 50% plasticizer | 60 | 100 | 95 | 95* |
| Ex. 3 | Steel plate precoated with vinylchloride containing 30% plasticizer | 80 | 140 | 35 | 45* |
| Ex. 4 | Transparent film precoated with vinylchloride containing 30% plasticizer adhered on the steel plate precoated with vinylchloride containing 30% plasticizer | 75 | 160 | 35 | 180 |
| Ex. 5 | Steel plate precoated with 30% plasticizer | 100 | 45 | 25 | 110 |
| Ex. 6 | Ornamental plate precoated with vinylchloride containing 35% plasticizer | 60 | 120 | 90 | 120 |
| Ex. 7 | Steel plate precoated with vinylchloride containing 30% plasticizer | 80 | 75 | 20 | 200 |
| Ex. 8 | Steel plate precoated with vinylchloride containing 30% plasticizer | 70 | 190 | 105 | 200 |
| Ex. 9 | Steel plate precoated with vinylchloride containing 50% plasticizer | 60 | 100 | 60 | 120 |
| Comparative Example 1 | Steel plate precoated with vinylchloride containing 30% plasticizer | surrounding temperature | 140 | near 0 | — |
| " | " | " | 140 | — | 250 |
| Comparative Example 2 | " | 80 | more than 500 | near 0 | — |
| Comparative Example 3 | " | 80 | more than 500 | near 0 | — |

*Sample was heated at 50°C, 100 hrs.

I claim:

1. An adhesive surface protective film for polyvinyl chloride substrate containing a plasticizer, comprising, an adhesive layer of 10–100μ in thickness, said adhesive layer containing 100 parts by weight of a vinyl polymer selected from the group consisting of ethylene-vinylacetate copolymer, ethylene-ethylacrylate copolymer, ethylene-propylene copolymer, wherein said tackifier is selected from the group consisting of rosin, modified rosin, polyterpene, styrene-butadiene rubber, acrylonitrile-butadiene rubber, cyclic rubber, cumarone resin, and indene resin.

6. A surface protective film according to claim 2, wherein the amount of said olefin polymer ranges from 10 parts to 60 parts by weight.

7. A surface protective film according to claim 2, wherein said thickness of said adhesive layer is from 20 to 80μ.

8. A surface protective film according to claim 2, wherein said adhesive layer is applied to said substrate at a temperature of from 60° to 100°C.

9. A surface protective film according to claim 8, wherein the amount of said olefin polymer is from 10 to 60 parts by weight.

10. A surface protective film according to claim 9, wherein the thickness of said adhesive layer is from 20 to 80μ.

* * * * *